United States Patent
Rose et al.

[11] Patent Number: 5,642,491
[45] Date of Patent: Jun. 24, 1997

[54] METHOD FOR EXPANDING ADDRESSABLE MEMORY RANGE IN REAL-MODE PROCESSING TO FACILITATE LOADING OF LARGE PROGRAMS INTO HIGH MEMORY

[75] Inventors: Robert Allen Rose, Delray Beach; Allen Chester Wynn, Lantana, both of Fla.

[73] Assignee: International Business Machines Corporation, Armonk, N.Y.

[21] Appl. No.: 309,862

[22] Filed: Sep. 21, 1994

[51] Int. Cl.⁶ ................................. G06F 12/06
[52] U.S. Cl. ........................... 395/402; 395/570
[58] Field of Search ..................... 395/700, 425, 395/402, 570; 364/200

[56] References Cited

U.S. PATENT DOCUMENTS

| | | | |
|---|---|---|---|
| 4,825,358 | 4/1989 | Letwin | 395/700 |
| 5,027,273 | 6/1991 | Letwin | 395/411 |
| 5,134,580 | 7/1992 | Bertram et al. | 395/650 |
| 5,144,551 | 9/1992 | Cepulis | 395/490 |
| 5,193,161 | 3/1993 | Bealkowski et al. | 395/416 |
| 5,210,873 | 5/1993 | Gay et al. | 395/650 |
| 5,255,379 | 10/1993 | Melo | 395/412 |
| 5,303,378 | 4/1994 | Cohen | 395/700 |

OTHER PUBLICATIONS

Chappell, Geoff. DOS Internals, chapter 8, "Extended Memory Access From Real Mode". pp. 355–385. Jan. 1994.

*Primary Examiner*—Jack A. Lane
*Assistant Examiner*—Kevin Verbrugge
*Attorney, Agent, or Firm*—Jeffrey S. LaBaw; David H. Judson

[57] ABSTRACT

Disclosed is a technique for overcoming the 1-Mbyte mode memory limitation associated with "real-mode" operation of certain Intel Corp. microprocessor architectures. This limitation can be overcome by altering the contents of a register portion that is computationally meaningful only in "protected mode," but which persists and exerts effects in real mode. By indirectly manipulating the contents of this register portion in protected mode in a manner that avoids disruption to the register during the switch back to real mode, access can be obtained, in real mode, to up to 4 Gbytes of volatile memory.

18 Claims, 1 Drawing Sheet

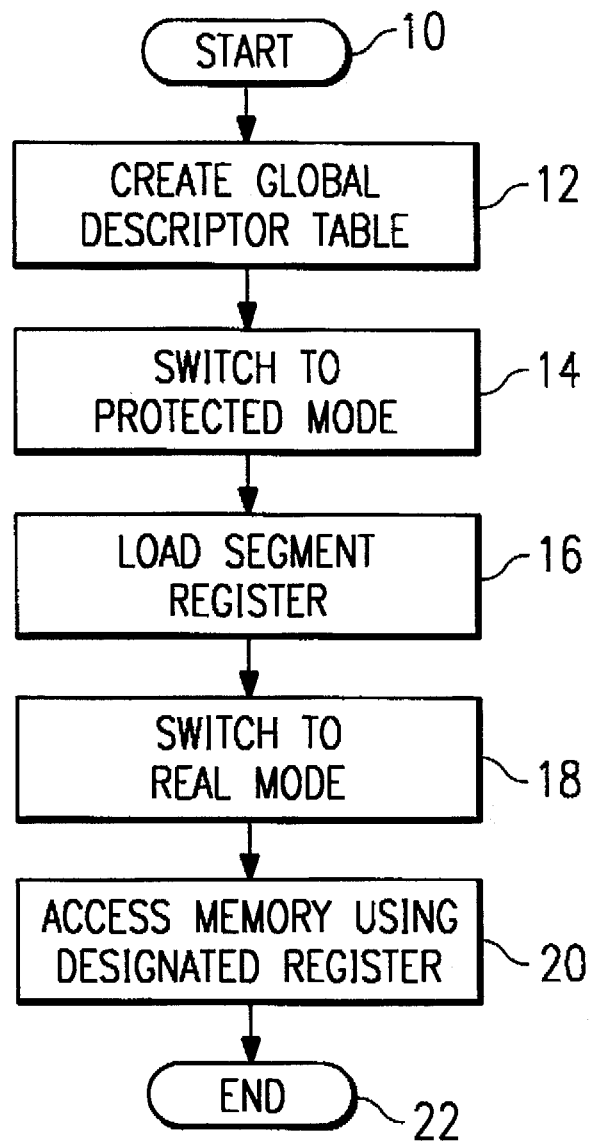

METHOD FOR EXPANDING ADDRESSABLE MEMORY RANGE IN REAL-MODE PROCESSING TO FACILITATE LOADING OF LARGE PROGRAMS INTO HIGH MEMORY

FIELD OF THE INVENTION

This invention relates to methods and apparatus for operating a computer system that utilizes a processor capable of operation in so-called "protected" and "real" modes.

BACKGROUND OF THE INVENTION

The "brain" of any personal computer is a microprocessor chip, which performs the functions once associated with dedicated hardware central-processing units. Microprocessors are generally organized into two functional areas: the arithmetic/logic unit (ALU) and the control section. The control section obtains instructions from memory and converts them into electronic signals that effectuate the operations they specify. These operations can involve the ALU or, via a bidirectional system bus, extend to every function and device associated with the computer.

A popular family of microprocessors used in personal computers is manufactured by Intel Corporation, Santa Clara, Calif. The internal architecture of these microprocessors, known generally by the designation "x86," has undergone significant evolution since the line was first introduced. The earliest x86 chips (the 8088, 8088-2, 8086 and 80186, hereafter collectively referred to as "8086" due to their similar attributes) were relatively limited in capability. 8086 microprocessors did not support "multitasking," i.e., the ability of a single computer to run more than one application at a time or to run background operations while other tasks are carried out. Also, the 8086 could only address a single Megabyte (Mbyte) of random-access memory (RAM)—adequate by then-prevailing standards but far too limited to run today's software. The 8086 addressed memory bytes in terms of their "real" or physical addresses in RAM. Specifically, an address was specified by a 32-bit pointer having two components: a 16-bit "segment selector" that specified the starting address of a sequential series of bytes (a "segment") to be retrieved; and an effective address offset specifying the displacement, in bytes, of a particular location within the segment. A 20-bit physical address was derived from these components by interpreting the 16-bit segment-selector value as a 20-bit s value having zeros in the in the four least-significant bits; the 16-bit offset value was then added to this 20-bit segment base to produce a 20-bit value designating the physical address. Each memory segment could contain data, commands, command stacks, interrupts, flags or some combination thereof.

Later x86 versions (the 80386, 80486 and Pentium, hereafter collectively referred to as "enhanced x86") have supported both multitasking and an expanded memory range (up to 4 Gigabytes, or Gbytes), as well as a sophisticated memory-protection scheme. To accommodate enlarged memory and a broader instruction set, enhanced x86 microprocessors do not address physical locations in memory directly. Instead, segment registers specify "virtual" addresses that correspond only indirectly to particular locations in physical memory. A memory-management scheme "maps" virtual addresses to their physical counterparts using one of a series of "descriptor tables," which contain entries that point to locations in physical memory. More specifically, the 13 bits of the virtual (or "logical") address, called the "segment selector," specify a location in a descriptor table that defines a memory segment in terms of its physical location and length in bytes. This arrangement facilitates relocation of segments to different portions of memory by mere alteration of entries in the descriptor tables.

Each descriptor table is an array of 8-byte entries called "descriptors." The segment selector identifies a segment descriptor by specifying a particular descriptor table and a descriptor within that table. The descriptor, in turn, specifies the base or starting location of the segment in physical memory. The use of different descriptor tables serves to isolate simultaneously running programs from one another while allowing them to access common resources in memory. Programs running under an enhanced x86 microprocessor specify either a Global Descriptor Table (GDT), which specifies system-wide procedures and data that are available to all active programs; or a Local Descriptor Table (LDT) corresponding to the particular program being run. Unlike the GDT, LDTs address memory locations that are separately masked for each program.

Because of the popularity of the x86 architecture, a substantial number of programs written for the 8086 were in widespread use when Intel introduced the 80286. In order to permit this body of programs to operate on enhanced x86 architectures, Intel designed these architectures to run in two modes. In "real address" or simply "real" mode, the microprocessor emulates the 8086, treating a memory address as corresponding directly to a physical memory location within the 1-Mbyte limit. In "protected" mode, the microprocessor treats an address as a segment selector, implementing the memory-relocation and masking features that characterize the enhanced x86 architecture. The microprocessor can be switched from real mode to protected mode with a single instruction.

This operational flexibility is important, because real-mode processing can prove necessary even outside the context of older programs. In particular, before the operating system and appropriate device drivers are loaded during system startup, disk input/output operations are typically performed in real mode. Routine memory operations (where protection is unnecessary) are also performed more conveniently in real mode, and even current operating software sometimes requires real-mode operation. Unfortunately, processing in real mode remains hampered by the 1-Mbyte address limit. For example, when the computer is initially powered up, the microprocessor loads the computer's operating system into RAM from mass storage; however, because modern operating systems occupy more than 1 Mbyte of memory, loading one in real mode is problematic and requires special techniques to overcome the address limit. Conventionally, programmers circumvent this limit by setting up a buffer of 64 kilobytes (kbytes) in real-mode addressable memory and transferring the operating system in 64-kbyte fragments using routines provided as part of the computer's firmware. This method is quite slow, however, because the transfer routines switch the microprocessor into protected mode in order to copy the contents of the buffer into high memory, then switch back to real mode to perform the mass-storage retrieval operations that bring another 64-kbyte fragment into the buffer. Thus, the operating mode must be switched twice each time the buffer contents are transferred into high memory—a cumbersome procedure, because mode-switching is very slow relative to other operations.

SUMMARY OF THE INVENTION

The present invention relieves programmers of the 1-Mbyte real-mode memory limit by exploiting an unusual artifact of enhanced x86 architectures. To understand the approach of the invention, it is important to recognize that the real-mode emulation offered by enhanced x86 architectures actually represents a variant of protected mode. It has been found that the addressable-memory limitation can be overcome by altering the contents of a register portion that can be modified only in protected mode. This register portion specifies an upper limit to the offset amount (64 kbytes in real mode) and cannot be directly accessed by programmers. However, by implicitly modifying the contents of this register portion in protected mode in a manner that avoids disruption to the register during the switch back to real mode, the invention is able to override the addressable-memory limitation and permit access, in real mode, of up to 4 Gbytes of RAM.

Accordingly, the method of the invention involves creating a descriptor table (preferably, although not necessarily a GDT) containing a single descriptor which, when accessed, will modify the contents of the current segment register to permit an offset limit of 4 Gbytes. The microprocessor is switched from real mode into protected mode, the descriptor is selected, and the microprocessor is switched back into real mode. Using 32-bit instructions that employ the modified register, addresses up to $FFFF\_FFFF_{hex}$ (or 4 Gbytes) can be accessed. The method of the invention allows bulk storage and retrieval operations to be accomplished very quickly, since the microprocessor is switched only once into protected mode; the memory operations are carried out in real mode.

BRIEF DESCRIPTION OF THE DRAWING

The foregoing discussion will be understood more readily from the following detailed description of the invention, when taken in conjunction with the single figure of the drawing, which illustrates in flow-chart form the operation of a representative embodiment of the invention.

DESCRIPTION OF THE PREFERRED EMBODIMENT

The present invention is best understood with particular reference to the addressing, memory-management and protection techniques utilized by enhanced x86 architectures. Further descriptions of these subjects appear in *Pentium™ Processor User's Manual* (Intel 1994) and U.S. Pat. Nos. 5,027,273 and 5,144,551. The subject matter of U.S. Pat. Nos. 5,027,273 and 5,144,551 is hereby incorporated by reference.

Enhanced x86 microprocessors utilize 16 registers of three different types and sizes. The general registers EAX, EBX, ECX, EDX, ESP, EBP, ESI and EDI are each 32 bits in length. The X registers EAX, EBX, ECX, EDX may be accessed as a 16-bit register or two independent 8-bit registers. In assembly language, the lower 16-bit portion of the EAX register is designated AX; the designations AL and AH denote the low and high eight bits of the AX register, and represent bits 0–7 and bits 8–15 of the EAX register. The general registers ESP, EBP, ESI and EDI may be accessed only as 16-bit or 32-bit registers.

A second group of registers, EIP and EFLAGS, maintain status and control information. The remaining six registers ES, CS, SS, DS, FS and GS are 16-bit segment registers that contain selectors (which specify descriptors) for purposes of memory addressing. A segment selector identifies a segment descriptor by specifying a descriptor table and a particular descriptor within that table. In addition, the selector specifies a privilege level associated with the requestor. The SS and CS registers perform specific tasks, the former referring to the segment containing the command stack for the task being executed, and the latter used to address the current code segment. Other segment registers have no dedicated uses and may be designated in instructions by the programmer.

A descriptor contains the 32-bit address in physical memory of the associated segment; its limit (i.e., the size in bytes), specified by a 20-bit field; a descriptor privilege level against which the selector privilege level is compared; and a series of settings that further define the segment. For purposes of the present invention, the important settings include a "granularity" bit and bits that determine whether the memory locations are "writeable" (i.e., available as free storage space) or merely "readable" (protected against overwriting). The granularity bit governs the manner in which the 20-bit limit field is interpreted. If the flag is not set, the limit bits are read directly, and designate a segment length of up to 1 Mbyte. If the granularity flag is set, the microprocessor scales the limit field by a factor of $2^{12}$, allowing the length to be specified in units of 4 kbytes to a maximum of 4 Gbytes.

As far as the user is concerned, segment registers contain only segment selectors that specify descriptors. However, the selector represents only the programmer-accessible ("visible") portion of the register. When, during program execution, the microprocessor encounters an instruction designating a memory segment, the segment register specified in the instruction (or the default register, usually DS) is examined and its (visible) selector contents used as a pointer to the proper descriptor. The microprocessor then copies the contents of the descriptor, including the segment base address and limit, into the programmer-inaccessible ("invisible") portion of the register, and utilizes the full register contents to retrieve the designated segment from RAM. Thus, the programmer is effectively insulated from physical memory addresses, and instead is constrained to designate more easily changed and managed descriptors.

In real mode, of course, the notion of selectors and descriptors has is no meaning; the contents of the selection registers directly designate physical memory addresses. However, as noted previously, real-mode processing in enhanced x86 architectures is actually an emulation, i.e., a variation of protected-mode processing that simulates real-mode behavior. We have found that the limit value in the invisible portion of the current segment register is used to determine the extent of memory addressable by that register in real mode. Ordinarily, in entering real mode from protected mode, the programmer will have loaded registers SS, DS, ES, FS and GS with selectors for descriptors having limits of 64 kbytes, and transferred control to a segment with a limit of 64 kbytes; the 64-kbyte limit is important to real-mode operation, since it effectuates the 64-kbyte wrapping feature associated with true 8086 real mode. However, since the limit also defines the field of addressable memory—a protected-mode property that persists during real-mode emulation—expanding the limit results in a corresponding extension of the addressable field. Because the invisible portion of the segment registers has no meaning in real mode, its values persist through sequential memory access operations.

As mentioned previously, the limit is specified by a 20-bit value scaled in single- or 4-kbyte increments. By specifying the maximum 20-bit range and setting the granularity bit, a full 4 Gbytes can be addressed in real mode.

Refer to the figure, which illustrates the preferred manner of introducing the necessary values into the invisible portion of a desired segment register and preserving this value as the microprocessor is switched to real mode. The process begins at a first block 10 and proceeds to the first substantive operation at block 12. In this preliminary step, a GDT is created. The GDT contains a single descriptor having a base address of zero and a size corresponding to the desired addressable field (preferably 4 Gbytes), further specified as readable and writeable. The next step, at block 14, occurs during system operation (typically at startup). In step 14, the microprocessor is switched into protected mode to enable loading of an appropriate limit field.

At block 16, the descriptor is designated, resulting in loading of its contents into the invisible portion of the designated (or default) register. The microprocessor is then switched back to real mode, as shown at block 18. This latter step is performed in a manner that does not disrupt the contents of the register loaded in step 16; specifically, the protect enable bit is cleared without reloading the default or designated register. Using this register to access memory locations in real mode, as shown at block 20, the entire range of memory specified in the invisible portion of the register is available. The process concludes at step 22. Because the value of the register limit field differs from the 64-kbyte limit that enables wrapping, the 64-kbyte limit should be imposed prior to further real-mode processing. This is accomplished, for example, by switching back to protected mode and loading the register with a selector for a descriptor containing a 64-kbyte limit value.

Steps 14–20 can be implemented by suitable processor instructions. For example, steps 14 and 18 are ordinarily accomplished with a MOV CRO instruction, which sets or resets the protect enable flag in the microprocessor's CRO register—an action interpreted as a command to switch modes. Step 16 can be performed using the instruction MOV [R],[n]
where [R] denotes any of the segment registers DS, ES, FS or GS and [n] denotes a selector specifying the location of the descriptor generated in step 12. Instructions that can exploit the expanded addressing capacity provided by the present invention are numerous; the primary restriction is use in a 32-bit form to ensure adequate addressing capacity. They include: MOV [R]:[G],[X]
where [G] denotes one of the 32-bit general registers and [X] denotes the value to store. This instruction moves [X] to the memory location specified by the contents of [R] and offset by the contents of [G], and is useful, for example, in loading memory with an image retrieved from mass storage (e.g., from a system hard disk).

Another useful instruction is: REP MOVSD
This instruction, which repeats a specified number of times, transfers the contents of the RAM location specified by DS:ESI (i.e., the address specified in the DS register offset by the contents of the ESI register) to the location specified by ES:EDI.

Another useful instruction is: STOSD
This instruction, which also repeats a specified number of times, stores the contents of the EAX register in the memory location specified by ES:EDI.

As noted previously, the results of steps 14–18 disable 64-kbyte wrapping. Therefore, the invention is best employed in initialization operations (e.g., loading of the operating system or other programs from mass storage) that take place before execution of application programs actually begins, or in conjunction with real-mode programs that do not depend on wrapping.

It will therefore be seen that the foregoing represents a highly efficient and straightfowardly implemented approach to expanding the memory-addressing capabilities of enhanced x86 microprocessors in real mode. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, although use of a GDT provides greatest operational convenience, it is equally possible to load values into the invisible portion of a segment register using an LDT and appropriate loading instructions (as well known to those skilled in the art).

What is claimed is:

1. A method of enlarging the addressable memory space in a computer comprising a processor, an addressable memory, an operating system and at least one segment-selection register to facilitate loading of the operating system into a high memory region of the addressable memory, the processor being capable of switchably operating in a real mode wherein the processor can address a limited range of memory or a protected mode wherein the processor can address a large range of memory including the high memory region, the real mode being characterized by a numeric value in the at least one segment-selection register that specifies the range of memory and that cannot be modified when the processor operates in the real mode, the method comprising:

a. in the protected mode, operating the processor to replace the numeric value in said segment-selection register with a different value specifying the large range of memory;

b. switching the processor to the real mode without modifying the value in said segment-selection register; and c. with the processor remaining in the real mode, accessing memory locations using said segment-selection register to store the operating system in the high memory region of the addressable memory.

2. The method of claim 1 wherein, in the real mode, each segment-selection register specifies a physical memory address.

3. The method of claim 1 wherein the memory contains at least one table comprising a plurality of descriptors, each descriptor specifying a segment base address and a memory limit, and further comprising the steps of:

a. loading into a table a descriptor specifying a base address of zero and a memory limit corresponding to the large range of memory; and b. operating the processor to select the descriptor using said segment-selection register, thereby loading the base address and the memory limit specified in the descriptor into said segment-selection register.

4. The method of claim 3 wherein the table is a Global Descriptor Table.

5. The method of claim 3 wherein the table is a Local Descriptor Table.

6. The method of claim 1 wherein the large range of memory corresponds to all memory in the computer system.

7. The method of claim 1 wherein the large range of memory is 4 Gbytes.

8. The method of claim 1 wherein memory is accessed by instructions.

9. The method of claim 8 wherein the instructions comprise load instructions.

10. The method of claim 9 wherein the instructions expressly reference the segment-selection register.

11. The method of claim 10 wherein the load instructions comprise move instructions.

12. A computer program product for use with a computer comprising a processor, an addressable memory, an operating system and at least one segment-selection register to facilitate loading of the operating system into a high memory region of the addressable memory, the processor being capable of operating in a real mode in which the processor can address a limited range of memory, or a protected mode in which the processor can address a large range of memory including the high memory region, the real mode being characterized by a numeric value in the at least one segment-selection register that specifies the range of memory and which cannot be modified when the processor operates in the real mode, said computer program product comprising:

a computer usable medium having computer readable program code means embodied in said medium for causing the computer system to enlarge the addressable memory space to facilitate loading of the operating system, the computer readable program code means comprising:

program code means for causing the processor, when in the protected mode, to replace the numeric value in the segment-selection register with a different value specifying the large range of memory;

program code means for causing the processor to switch to the real mode without modifying the value in the segment-selection register; and program code means, operative while the processor remains in the real mode, for accessing memory locations using the segment-selection register to store the operating system in the high memory region of the addressable memory.

13. The computer program product as defined in claim 12, wherein the memory contains at least one table comprising a plurality of descriptors, each descriptor specifying a segment base address and a memory limit, and wherein the computer program further comprises:

a means for causing the computer system to load into a table a descriptor specifying a base address of zero and a memory limit corresponding to the large range of memory; and a means for causing the processor to select the descriptor using the segment-selection register, thereby loading the base address and the memory limit specified in the descriptor into the segment-selection register.

14. The computer program product as defined in claim 12 wherein the large range of memory corresponds to all memory in the computer system.

15. In a computer system having a processor operable in real mode or protected mode, a disk memory, an addressable memory, and at least one segment-selection register, a method of loading a program from disk memory into a high memory region of the addressable memory during system initialization, wherein the program is substantially larger in size than a first range of addressable memory accessible by the processor operating in real mode, the method comprising:

(a) with the processor operating in protected mode, setting a value in the segment-selection register to specify a second range of addressable memory that is substantially larger than the first range of addressable memory and that includes the high memory region, wherein the value is otherwise write-protected when the processor operates in the real mode; and (b) with the processor operating in real mode, accessing memory locations using the segment-selection register to locate the program in the high memory region.

16. The method as described in claim 15 wherein the program is a protected mode operating system.

17. A computer, comprising:

a processor selectively operable in real mode or protected mode;

an addressable memory having a high memory region for receiving a program to be loaded from disk memory during system initialization, the program being substantially larger in size than a first range of addressable memory accessible by the processor operating in real mode;

at least one segment-selection register;

means, operative while the processor is in protected mode, for setting a value in the segment-selection register to specify a second range of addressable memory that is substantially larger than the first range of addressable memory and that includes the high memory region, wherein the value is otherwise write-protected when the processor operates in the real mode; and means, operative while the processor is in real mode, for accessing memory locations using the segment-selection register to locate the program in the high memory region.

18. The computer as described in claim 17 wherein the program is a protected mode operating system.

* * * * *